(12) United States Patent
Aichele

(10) Patent No.: US 7,540,236 B2
(45) Date of Patent: Jun. 2, 2009

(54) APPARATUS FOR PRINTING ON OR OTHERWISE DECORATING HOLLOW BODIES

(75) Inventor: Helmut Aichele, Goppingen (DE)

(73) Assignee: Hinterkopf GmbH, Eislingen/Fils (DE)

( * ) Notice: Subject to any disclaimer, the term of this patent is extended or adjusted under 35 U.S.C. 154(b) by 553 days.

(21) Appl. No.: 11/287,327

(22) Filed: Nov. 28, 2005

(65) Prior Publication Data

US 2006/0112840 A1    Jun. 1, 2006

(30) Foreign Application Priority Data

Nov. 26, 2004   (EP)   ................... 04028077

(51) Int. Cl.
*B41F 17/14* (2006.01)
*B41F 15/30* (2006.01)

(52) U.S. Cl. .................. 101/35; 101/114; 198/804; 198/812

(58) Field of Classification Search .................. 101/35, 101/114; 198/804, 812
See application file for complete search history.

(56) References Cited

U.S. PATENT DOCUMENTS 5,657,690 A    8/1997   Douville et al.

2001/0025572 A1   10/2001   Aichele
2001/0025573 A1   10/2001   Aichele

FOREIGN PATENT DOCUMENTS

| CH | 320 352 A | 3/1957 |
|---|---|---|
| DE | 200 12 523 U1 | 2/2001 |
| EP | 1 132 207 A1 | 9/2001 |
| EP | 1 138 484 A2 | 10/2001 |
| EP | 1 468 827 A1 | 10/2004 |
| FR | 2 748 454 A | 11/1997 |

*Primary Examiner*—C. J Arbes
(74) *Attorney, Agent, or Firm*—Browdy and Neimark, P.L.L.C.

(57) ABSTRACT

An apparatus for printing on and/or otherwise decorating hollow bodies comprises a plurality of processing stations of different types, in which supplied hollow bodies may be processed in different ways. For conveying the hollow bodies a conveyor chain arrangement is provided serving the individual processing stations and consisting of conveyor chain sections able to be linked together by coupling means to constitute a conveyor chain in a closed loop with alternatively possible different paths. These different paths are characterized in that the processing stations may be served by the conveyor chain in different orders and/or partially obviated by it.

24 Claims, 11 Drawing Sheets

APPARATUS FOR PRINTING ON OR OTHERWISE DECORATING HOLLOW BODIES

BACKGROUND OF THE INVENTION

The invention relates generally to the field of apparatus employed for printing on or otherwise decorating hollow bodies having a round outline such as sleeves, collapsible tubes, cans or the like. The term "decorating" also for example includes measures for painting, varnishing, labeling or foil embossing.

THE PRIOR ART

As examples of such generic apparatus there is the apparatus described in the European patent publication 1 138 484 A2, the European patent publication 1 132 207 A1 and the European patent publication 1 468 827 A1. The European patent publication 1 468 827 A1 is concerned with a printing machine designed for screen printing on hollow bodies.

Despite the fact that in such apparatus in addition to decoration other treatments may be performed on the hollow bodies, such apparatus is generally referred to in the present specification as "decorating apparatus".

A decorating apparatus can be designed to perform various different processing operations in sequence. For this purpose the decorating apparatus possesses suitably designed processing stations which are conventionally arranged in a line and through which the hollow bodies are moved by means of a conveyor chain arrangement in sequence. The conveyor chain arrangement possesses a conveyor chain performing a unidirectional circulating movement about suitably placed bend pulleys, such conveyor chain being provided with hollow body carriers spaced apart in the direction of conveying and on which the hollow bodies to be conveyed are detachably held. As a rule the hollow bodies are temporarily removed from the conveyor chain at the individual processing stations and following the treatment are replaced on the conveyor chain at a different position, the conveyor chain finally bringing the hollow bodies to a so-called product exit, where they are taken from the decorating apparatus.

During the operation of the decorating apparatus the individual processing stations are served in a set order corresponding to the respective design of the machine. For instance the hollow body move in sequence through a litho station, a screen printing station and a varnishing station. In another form of apparatus the order may be so selected that the screen printing station and the litho station are exchanged. If in an existing processing station no treatment is to be implemented, the hollow bodies are all the same moved through this processing station, which is then however put out of operation and does not perform its set task.

As will be apparent the individual forms of apparatus are specially adapted to the respective application. Changes in the order of treatment made available are not possible. Therefore for different cases of application a respectively separate decorating apparatus is required involving substantial financial resources and space requirements.

SHORT SUMMARY OF THE INVENTION

One object of the present invention is to suggest measures rendering possible a more adaptable treatment of hollow bodies in a decorating apparatus.

In order to achieve these and/or other objects appearing from the present specification, claims and drawings, in the present invention an apparatus for printing on and/or other decoration of hollow bodies, collapsible tubes, cans or the like is provided, which comprises several processing stations of different types so designed as to be able to perform different treatments on hollow bodies supplied to them, and a conveyor chain arrangement for serving the individual processing stations, designed for conveying such hollow bodies, the chain arrangement being composed of several conveyor chain sections arranged in the apparatus and being able to be linked together to form a conveyor chain as a closed loop by coupling means to perform a circulating motion in operation with alternatively different paths, in which the processing stations have the conveyor chain serving them in a different sequence and/or are partly obviated by the conveyor chain.

It is in this manner that the order of processing of the hollow bodies may be freely selected within one and the same apparatus. The resetting necessary for this may be performed while the conveyor chain arrangement is still within the apparatus and is consequently able to be performed relatively rapidly. If required a no longer necessary processing station may be excepted from the path of the conveyor chain so that a conveyor chain section running through such no longer necessary processing station remains which is uncoupled from the rest of the conveyor chain and immobilized. This renders possible a higher processing speed than in cases where the hollow bodies must move through an inactive processing station. The flexibility of the apparatus is all in all due to the conveyor chain arrangement's being divided up into several conveyor chain sections, which may be differently linked together by coupling means or chain joints so that as regards the circulating path of the conveyor chain different orders of passing through the stations are possible or even one or more of the processing stations may be completely obviated by, or omitted from, the path of the conveyor chain. The conveyor chain arrangement preferably as a whole remains, independently of the selected chain path, unchanged so that, apart from the one or the other coupling means, a conveyor chain section does not have to be added or removed. Furthermore the other technical features, as for example the bend pulleys present, can be left as they are. The resetting for a different chain path takes place simply by separating the conveyor chain at the coupling means and by a changed linking together of the conveyor chain sections, which are present. If for example the apparatus includes a screen printing station and a litho station, a variation in the path of the conveyor chain may be more particularly so implemented that in one path or route the litho station is served prior to the screen printing station and in the other path the screen printing station is served prior to the litho station. The apparatus is accordingly extremely adaptable as it is and there is no need for expensive multiple investments in equipment.

In the present case the term "apparatus" is to mean inter alia both arrangements in which processing stations are in the form of individual mechanical units and also machines, whose individual processing stations are for example integrated.

Further advantageous developments of the invention are defined in the claims.

For holding and conveying the individual hollow bodies the conveyor chain arrangement preferably comprises a chain run made up of a plurality of articulatingly connected chain links with hollow body carriers distributed along the length of the chain run to render possible detachable mounting thereon of the hollow bodies to be processed. The longitudinal axes of the hollow bodies seated on the hollow body carriers are preferably horizontal or aligned to be slightly at a slant to the horizontal. Preferably the hollow body carriers comprise rod structures extending away from the chain run, preferably with at least one carrier rod.

As coupling means conventional chain joints may be employed, which even today are utilized as a standard way of joining the ends of a conveyor chain after installation in an apparatus.

For a high degree of adaptability as regards the respective configuration of the chain run to be adopted, the conveyor chain arrangement preferably comprises several length sections intersecting with each other with a horizontal offset, such sections extending past each other. It could be said here that intersecting length sections of the chain run past each other in different planes.

Normally it will be desirable for the processing stations present to be so arranged that same lie in a single line and are able to be served by a principal component of the conveyor chain arrangement, which extends in an principal upright plane, which is preferably slightly inclined to the vertical in order to have a stable position of the hollow bodies borne thereon. In order to render possible an intersecting run of the conveyor chain the conveyor chain arrangement then preferably also comprises furthermore one or more detour components that are guided out of the principal plane by suitable guide means to run at some distance from the principal plane. In this manner the conveyor chain arrangement may have several detour components extending athwart the principal plane with an offset between them, the number thereof being in accordance with the number of the processing stations, which are able to be linked with each other in a variable manner. The sum of the principal components and of the detour components is preferably the same as the overall number of processing stations able to be linked together in a variable manner as regards loading thereof.

If the conveyor chain arrangement possesses several detour components, they can be arranged on the same side of the principal plane, if required placed in a mutually offset arrangement. It is also possible to provide at least one respective detour components on either side of the principal plane.

The conveyor chain arrangement is preferably so designed that in the case of at least one path of the chain all conveyor chain sections present are linked together to constitute the conveyor chain. There is then no uncoupled, stationary conveyor chain section.

In the case of at least one path of the conveyor chain it is convenient for one or more conveyor chain sections to be uncoupled from the conveyor chain and while still being present in the arrangement or, respectively, the machine may be non-operational. The question of which conveyor chain section or sections are involved here will depend on the desired concatenation of the processing stations.

In order to undertake resetting to produce a different chain path the conveyor chain is preferably able to be driven into at least one special resetting position. Here the terminal regions of several conveyor chain sections assume such a position that after uncoupling associated coupling means shifting of the terminal regions of the conveyor chain section is so possible that terminal regions so far not coupled with one another are now associated with each other and may be joined together by coupling means to produce a different chain path or configuration. The uncoupling, change of position and renewed coupling of conveyor chain section may for example be performed manually quite simply.

Resetting to produce a different chain path is as a rule only possible if the individual conveyor chain sections have adopted a predetermined relative order taking into account the specific path as set by bend pulleys. In order to simply find such relative order in a reproducible fashion the conveyor chain arrangement is preferentially provided with at least one mark which assumes a predetermined processing position, when the conveyor chain is in the resetting position. The arrival in the processing position may for example be detected by suitable sensor means.

Preferably the arrangement is such that in one single resetting position all forms of resetting can be performed in any desired order. However, it is possible as well to have different resetting positions.

The mark is preferably located on a conveyor chain section belonging to the conveyor chain in every set path of the conveyor chain.

Resetting to produce a different chain path is facilitated if the conveyor chain arrangement is provided with several chain holders by which the relevant conveyor chain sections may be locked and made immovable for such resetting. It is in this manner that it is possible to prevent, inter alia, a conveyor chain section unwinding from an unbraked bend pulley under its own weight and falling off the machine. Owing to the chain holders a non-operative conveyor chain section may be fixed in relation to the machine so that even when subjected to vibrations its uncoupled position is adhered to without change and it remains available in position for the next resetting operation.

The chain holders can engage the chain links in an interlocking fashion. Preferably they are adapted for engaging the conveyor chain section, which is to be held, with a clamping action.

During operation a certain pretensioning of the conveyor chain is generally required. Such pretensioning renders possible simple handling of the coupling means with little effort. In order to have the variable pretensioning the apparatus is preferably equipped with suitable chain tensioning means.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
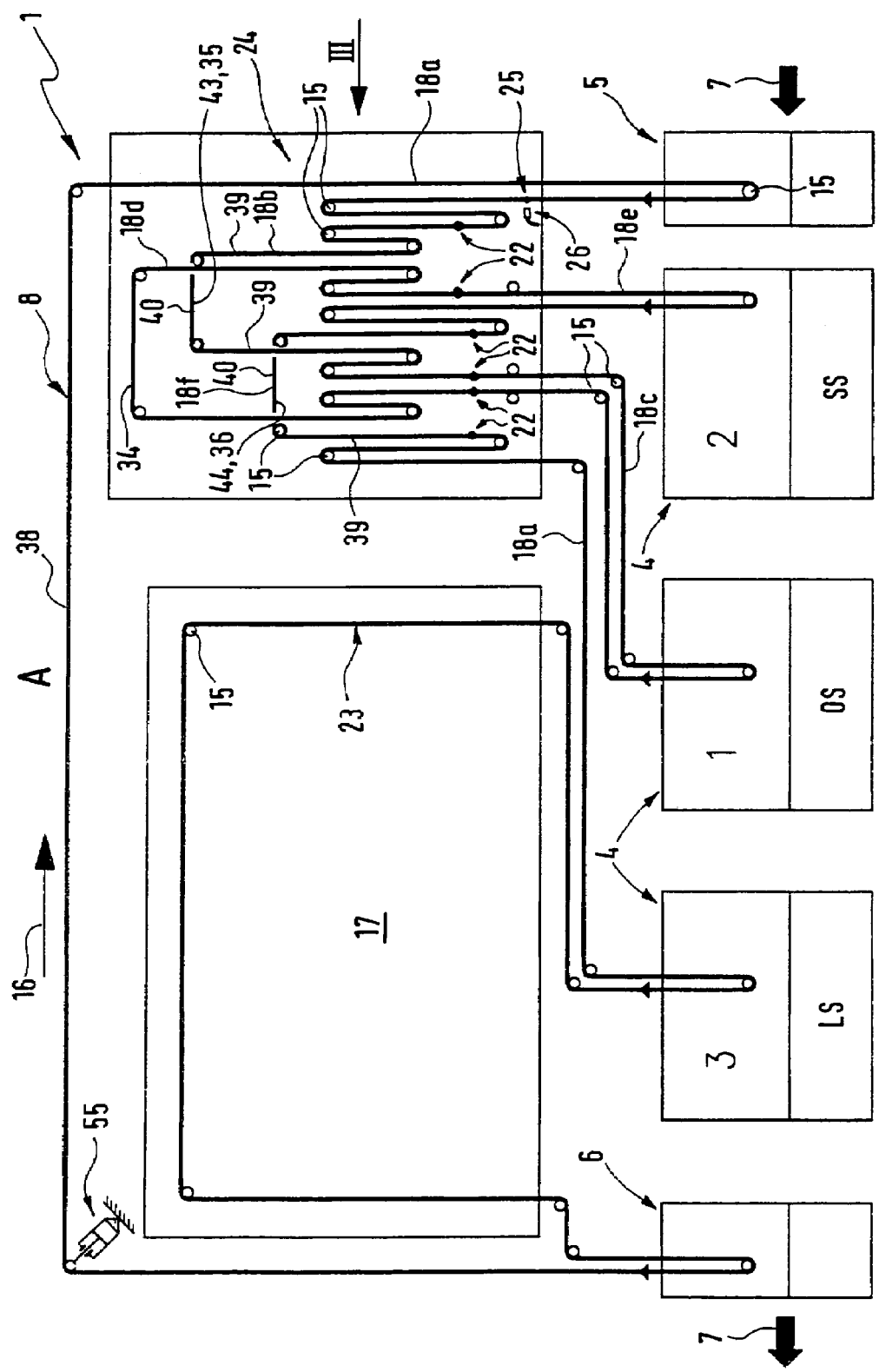
FIG. 1 is a diagrammatic side view of a mechanical apparatus in accordance with the invention in a preferred setup, the processing stations including a screen printing station "SS", a litho station "OS" and a varnishing station "LS", the conveyor chain arrangement being composed as a chain path termed the "version A".

The decorating apparatus generally referenced 1 is designed for decorating the outer periphery of hollow bodies 2 having a round cross section. In the case of such hollow bodies 2 it is a question of, for example, sleeves, collapsible tubes or cans. In the finished state they are, for example, for cosmetics or beverages.

As decorating measures the apparatus 1 of the working example renders possible printing by means of screen printing and/or litho, and varnishing or other coating of the hollow bodies 2 or in fact any surface treatment of tubular bodies. This list is however by way of example and in no way comprehensive. As an alternative or in addition further decorating measures may be integrated in the apparatus 1, as for example for the performance of labeling and/or embossing operations.

There is also the possibility of so adapting the apparatus 1 that, in addition to the possible treatments relating to decorating as described, still further possibilities of treatment may be employed, as for example those relating to the shaping of the hollow bodies 2 and/or to the application of a closure.

For the individual treatment operations the apparatus 1 is provided with corresponding processing stations 4 which are preferably arranged in a linear row, that is to say in a line. The row of processing stations 4 is preceded by a product entry station 5, while a product exit station 6 is arranged downstream.

At the product entry station 5 hollow bodies 2 to be processed are introduced into the apparatus 1. At the product exit station 6 the hollow bodies 2 are removed following the conclusion of the treatment measures. For supply and removal conveying means 7, indicated by arrows, are provided which are concatenated with the product entry station 5 and, respectively, with the product exit station 6.

In the working embodiment between the product entry station 5 and the product exit station 6 three processing stations 4 are provided, in the case of which it is a question of a screen printing station "SS" next to the product entry station 5, an offset litho station "OS", following it and next a varnishing or coating station "LS" preceding the product exit station 6.

Figure 2:
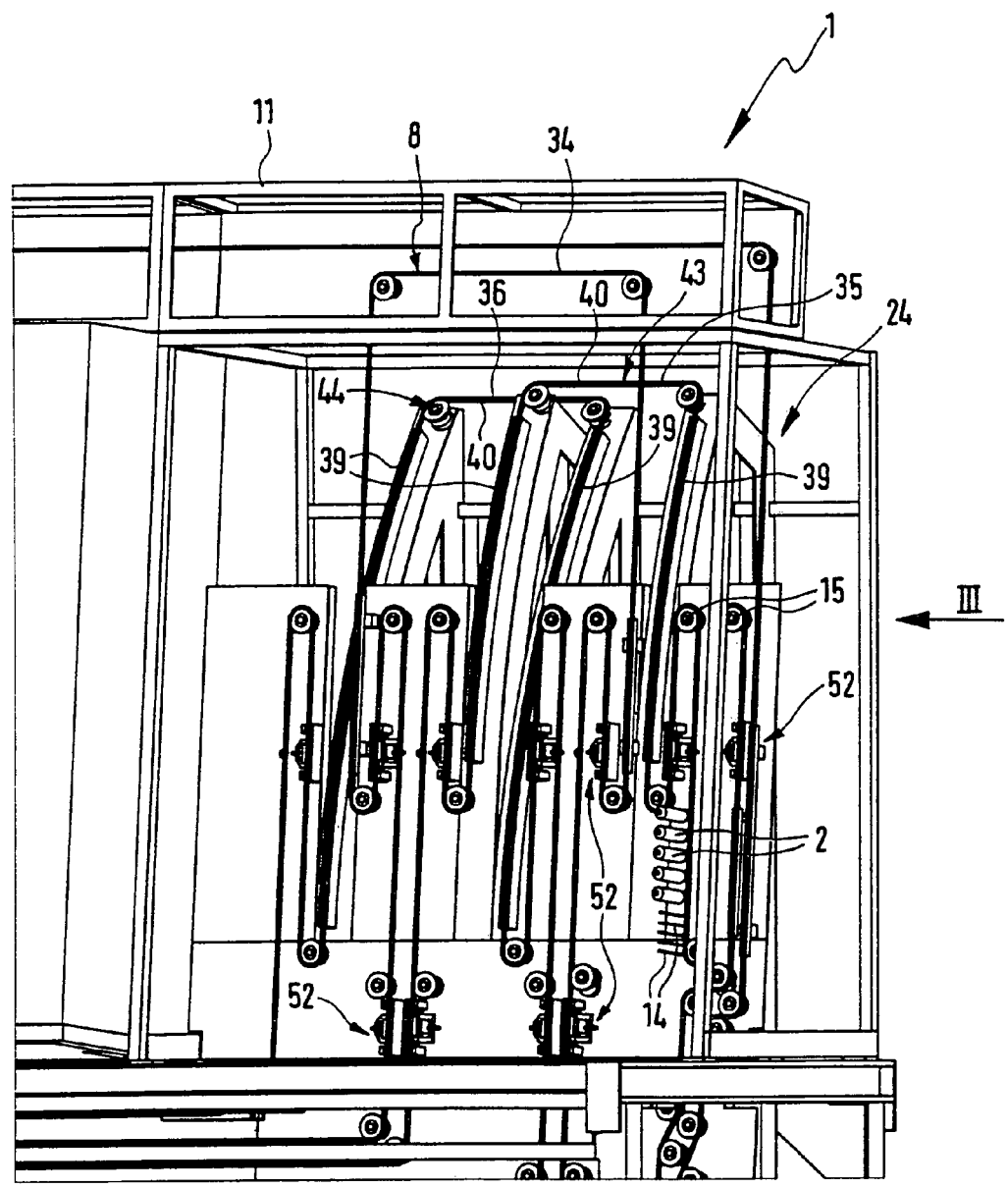
FIG. 2 represents a less diagrammatic view of the apparatus of FIG. 1 at the resetting zone, in which the manipulations necessary for resetting the chain path are performed.
Figure 3:
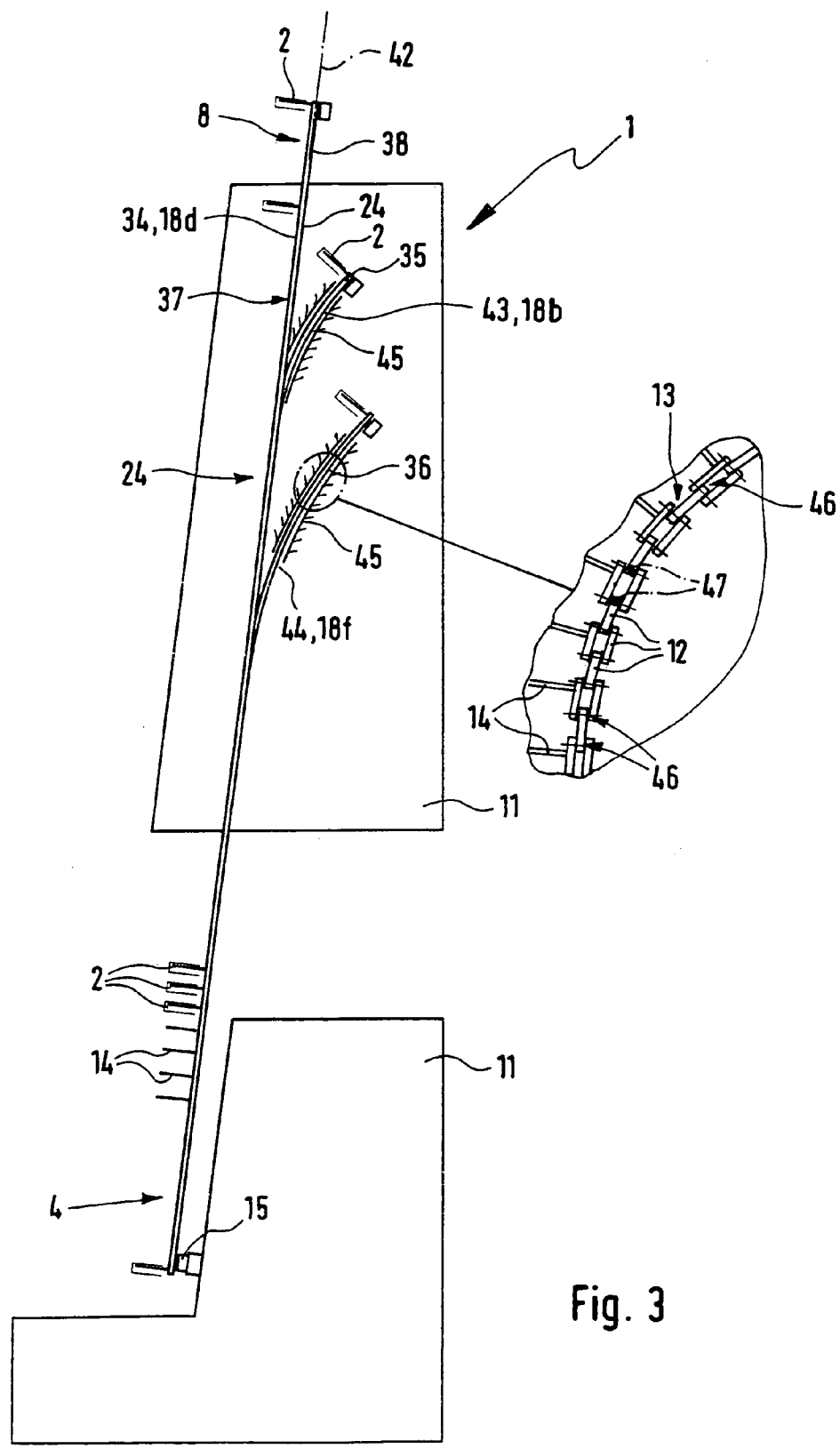
FIG. 3 is an end-on view of the apparatus according to FIGS. 1 and 2 looking in the direction of the arrow III in a highly diagrammatic form and mainly featuring the conveyor chain arrangement.
Figure 7:
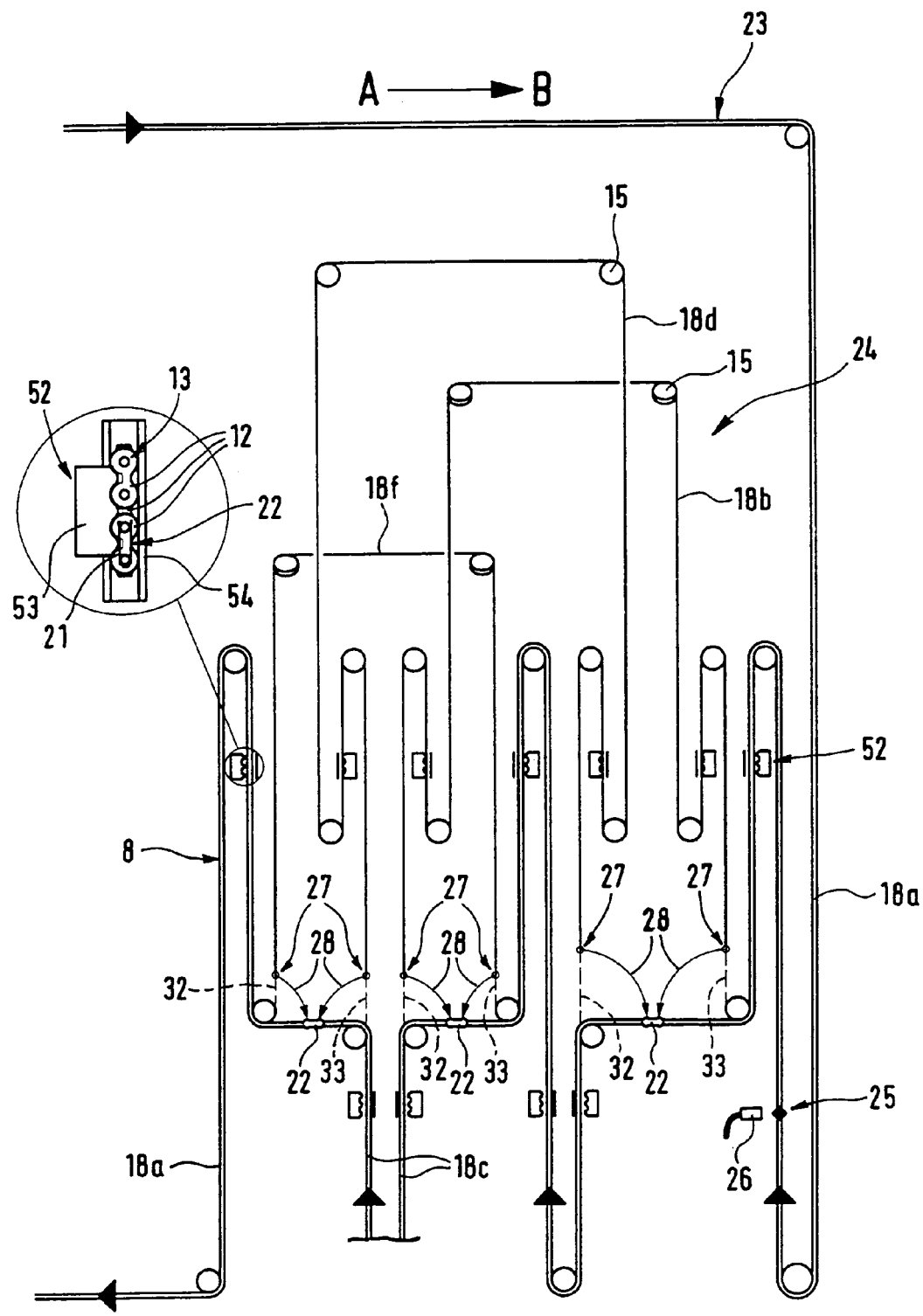
FIG. 7 is a separate view of the resetting zone, the measures for resetting the conveyor chain to change from the version "A" to the version "B" being indicated.

A conveyor chain arrangement generally referenced 8 runs through the apparatus 1. As indicated in FIGS. 3 and 7 showing the section on a larger scale, the conveyor chain arrangement 8 comprises a chain line or element 13 composed of a plurality of chain links 12 articulating with each other, such chain element 13 comprising, see FIGS. 2 and 3, a plurality of hollow body carriers, which are each adapted for bearing a hollow body 2 to be conveyed.

The hollow body carriers 14 are arranged at an equal spacing between them along the length direction of the chain element. They preferably respectively each comprise a rod structure, extending away from the chain element 13, over which the hollow body 2 to be conveyed is slipped so that it may be readily pulled off. In the simplest case each hollow body carrier 14 has its own carrier rod aligned athwart the vertical direction.

For the sake of a better overall picture in the drawing the hollow body carriers 14 and the hollow bodies 2 are only partly shown. In practice the chain element 13 is fitted with hollow body carriers 14 along its full length.

The conveyor chain arrangement 8 is trained around a plurality of bend pulleys 15, whose distribution sets the longitudinal path of the conveyor chain arrangement 8 and which are mounted in a rotatable manner on the apparatus frame 11. The bend pulleys 15 are at least partly driven by electric motor means and can exert a driving force on the conveyor chain arrangement 8 in order to cause a unidirectional conveying movement 16 around the bend pulleys 15. As a rule the bend pulleys 15 will be in the form of toothed sprocket wheels.

The path of the conveyor chain arrangement 8 is so selected that it serves both the product entry station 5 and the product exit station 6 and also all processing stations 4. In other words the conveyor chain arrangement 8 extends through 11 such stations or at a sufficient distance past them. In the product entry station 5 the conveyor chain arrangement 8 has the hollow bodies 2 to be processed put on it, which it delivers in the product exit station 6 again.

In the working example the conveyor chain arrangement 8 also runs through a diagrammatically indicated dryer 17 in which the printed and/or varnished hollow bodies 2 are dried prior to reaching the product exit station 6. Inside the dryer 17 the conveyor chain arrangement 8 is preferably meandered in order to render possible a high density of filling. The drawing is to this extent considerably simplified.

The conveyor chain arrangement 8 is divided up into individual conveyor chain sections 18a through 18f, which are able to be connected together in a detachable manner by coupling means 2 so that a closed loop of conveyor chain 23 results, that is composed of conveyor chain sections 18a-18f joined together by coupling means 22. It is then specifically this loop of conveyor chain 23, which during operation of the apparatus performs the conveying motion 16 as a circulating movement around the associated bend pulleys 15.

A particular advantage of the apparatus 1 is that the conveyor chain arrangement 18a through 18f, while remaining on the machine, may be linked together in different ways in order to have different paths of the conveyor chain 23. This means that the order, in which the processing stations 4 have the conveyor chain 23 (performing the conveying movement 16) running through them, may be varied. Moreover such a path of the conveyor chain 23 may be produced that at least one of the processing stations 4 is completely obviated and not served by the conveyor chain running in a closed loop. Accordingly there is the possibility of freely choosing the type of processing and the order thereof for the hollow bodies 2 conveyed through the apparatus 1. One and the same apparatus 1 accordingly makes possible an quite a varied treatment of the hollow bodies 2.

FIG. 1 shows a linked chain formation, termed version "A", in which all conveyor chain sections 18a through 18f of the conveyor chain arrangement 8 are linked together using coupling means 22. All conveyor chain sections 18a through 18f therefore contribute to the formation of the conveyor chain 23. In accordance with the illustrated order of linking the hollow bodies 2 supplied by way of the product entry station 5 firstly run through the litho station "SS", then the screen printing station "OS" and then following this the varnishing station "LS" before movement through the dryer 17 takes place.

Figure 4:
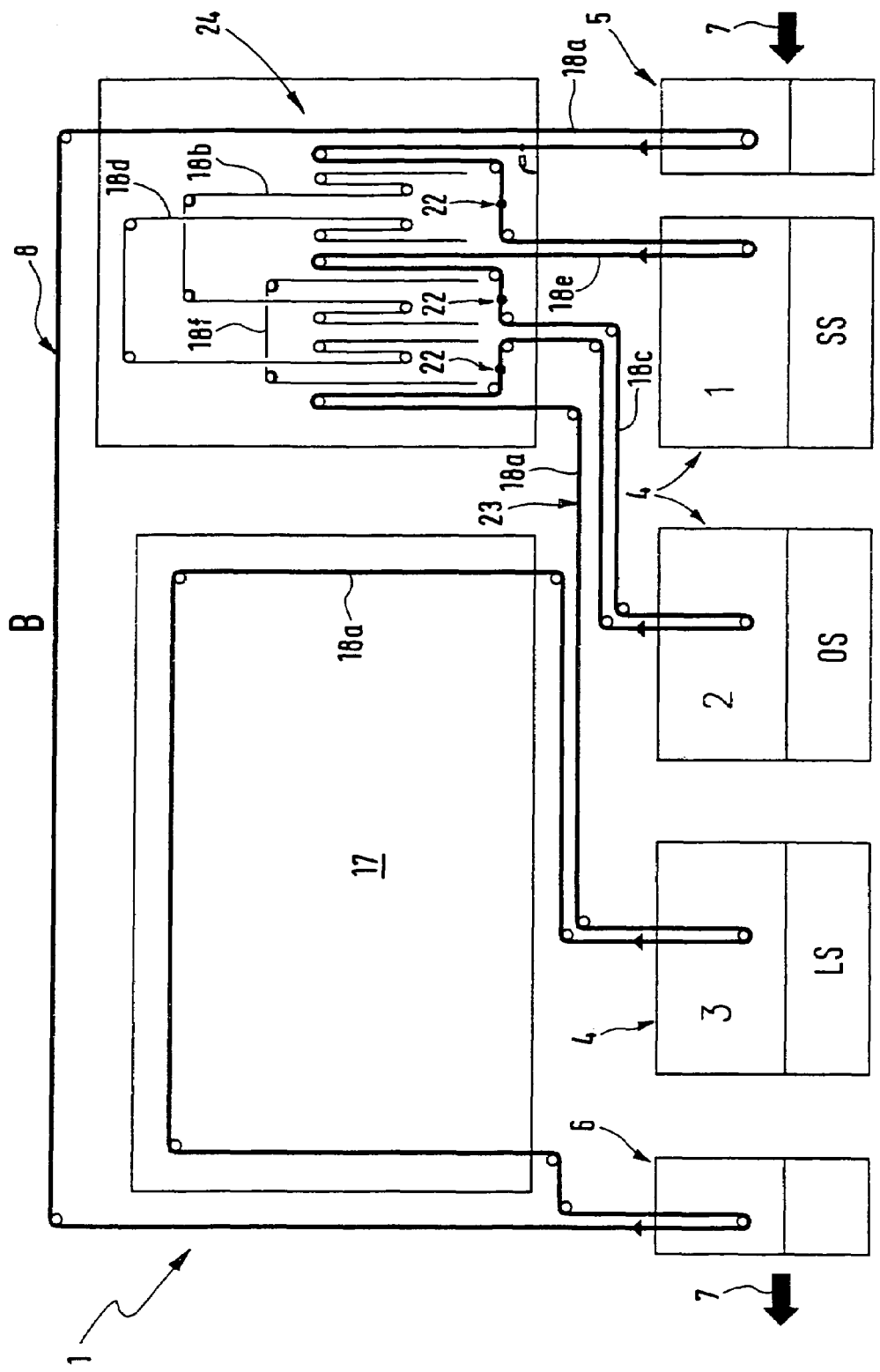
FIGS. 4 through 6 show paths of the conveyor chain in the same manner of representation as in FIG. 1 produced by resetting the conveyor chain arrangement (versions B, C and D).

In the case of the version "B" of chain linking depicted in FIG. 4 the conveyor chain sections 18b, 18d and 18f are not integrated in the conveyor chain 23. They are uncoupled and do not move during operation of the apparatus 1. The conveyor chain 23 is now composed of the remaining conveyor chain sections 18a, 18c and 18e, something which in the working example means that the order of serving of the screen printing station "SS" and the litho station "OS" is the reverse of the order in the version "A".

Figure 5:
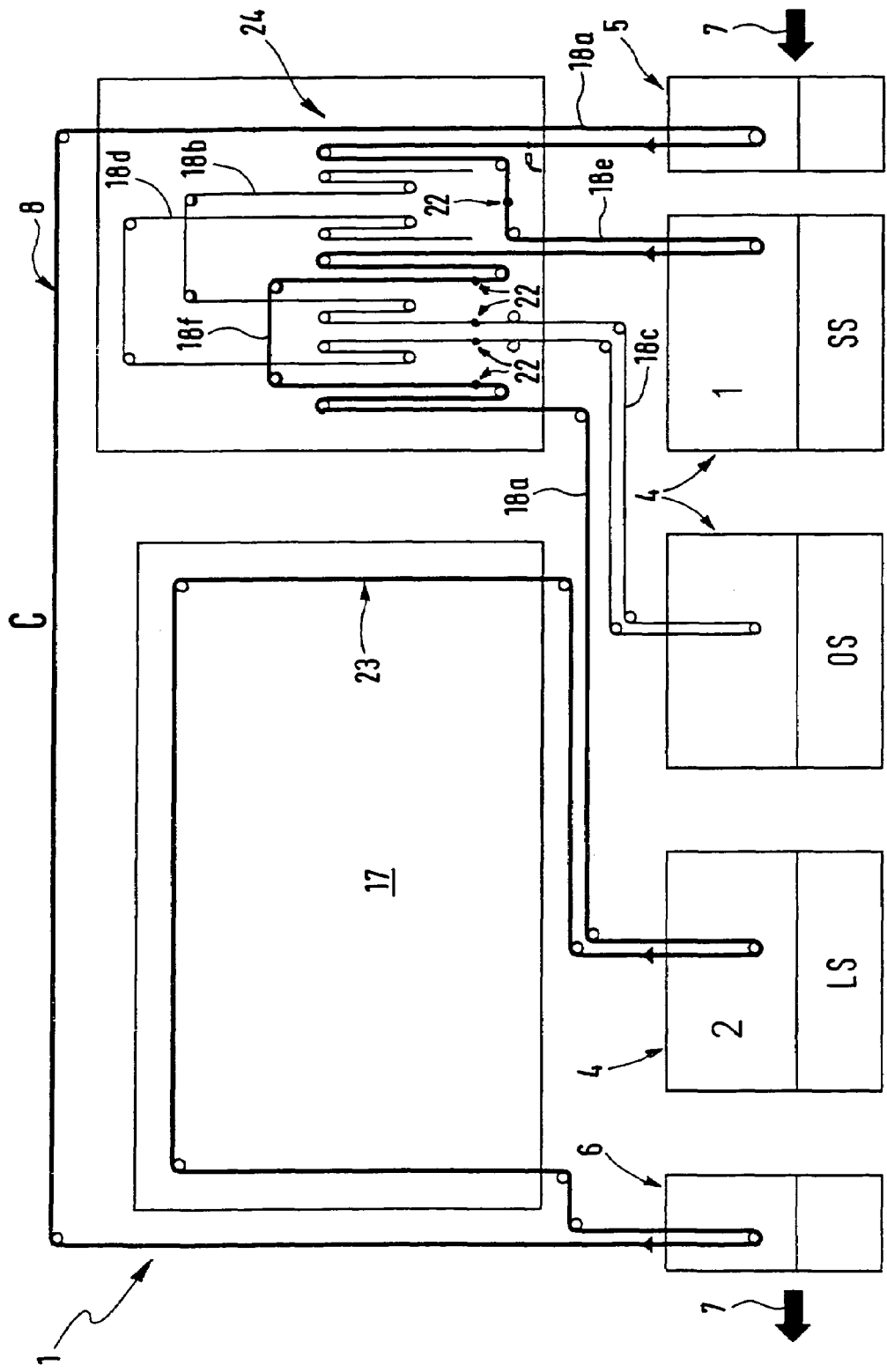
Figure 6:
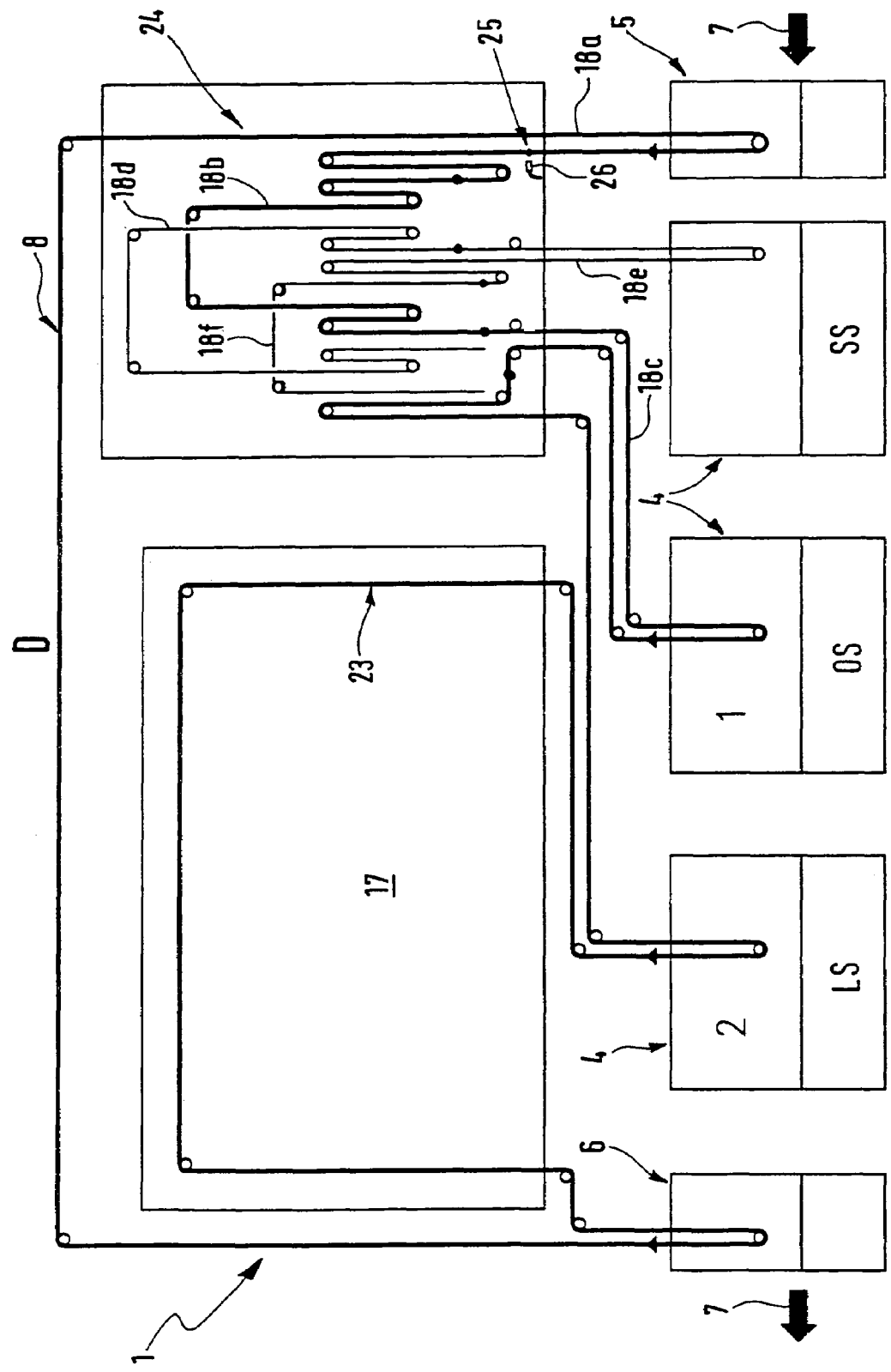

In the version "C" illustrated in FIG. 5 conveyor chain sections 18b, 18c and 18f are isolated and only the remaining chain sections 18a, 18e and 18f are linked together to constitute the conveyor chain. Since in this case inter alia the conveyor chain section 18c for the litho station "OS" is deactivated, the complete litho station "OS" is out of operation. During the circulating movement of the conveyor chain 23 the hollow bodies 2 only go through the screen printing station "SS" and the varnishing station "LS" and as a selection of the processing stations 5, and circumvent the litho station "OS".

In the case of version "D" also illustrated the screen printing station "SS" is deactivated and of the processing stations the hollow bodies 2 only go through the litho station "OS" and the varnishing station "LS". In this case the conveyor chain sections 18a, 18b and 18c are linked together to form the conveyor chain 23. On the other hand the remaining conveyor chain sections, including the conveyor chain sections "SS" for the screen printing, are uncoupled and inactivated.

The uncoupled and inactivated conveyor chain sections remain installed in the apparatus in every version. There is no removal and renewed installation for reuse.

In the versions "A" through "D" illustrated in the figures the order of serving of the individual processing stations 4 is indicated by the numbers "1", "2" and if appropriate "3".

Independently of the selected path of the conveyor chain 23 for resetting the apparatus 1 there is neither an addition of conveyor chain sections nor a removal of conveyor chain sections from the apparatus. Only parts of the coupling means may be removed for the time being, if one or other of the conveyor chain sections is deactivated. This is however dependent on the design of the coupling means.

In the working embodiment as coupling means 22 conventional, so-called chain joints are provided. Such a joint is illustrated in FIG. 7. Here it is a question of two pins able to be inserted through the terminal chain links of two conveyor chain sections to be connected together, such pins being at one end being fixedly connected together by a lug and at the other end secured by a clip 21.

If required differently designed chain joints 22 may be employed.

Resetting the conveyor chain 23 for a different chain path is preferably always performed in conjunction with positioning of the chain joints 22 present in a specific resetting zone 24 of the apparatus 1. The potential coupling points 27 are therefore collected together in this resetting zone 24, something which permits simple handling. The position in this case assumed by the conveyor chain 23 may therefore be termed the reset position.

Preferably the reset position of the conveyor chain 23 is constant and independent of the reset to be performed, i.e. in the chain path to be set. This simplifies the control of the apparatus, because the conveyor chain 23 always only has to be moved into one, predetermined position in order to perform the necessary manipulations.

Reproducible position in the reset position is facilitated in the working example because the conveyor chain 23 has a mark 25 which for every reset only has to be positioned in a predetermined working position. In order to render possible a precise location of the working position in the working example there are suitable sensor means 26 alongside the conveyor chain 23, such sensors being responsive to the mark 25. In this respect it may be a question of contactless sensor technology. As a mark 25 it is possible for example to provide a permanent magnet, a switching cam or the like.

The mark is preferably located in a conveyor chain section 18a, which constitutes a component of the conveyor chain 23 in every set chain path.

More particularly in the case of a modification of the working example involving the use of different reset positions of the conveyor chain 23 for different changes in the chain path, it is possible for the conveyor chain arrangement 8 to be provided with several marks 25, which may then also be located on different conveyor chain sections, which at least partly may be deactivated for a set chain path.

Figure 8:
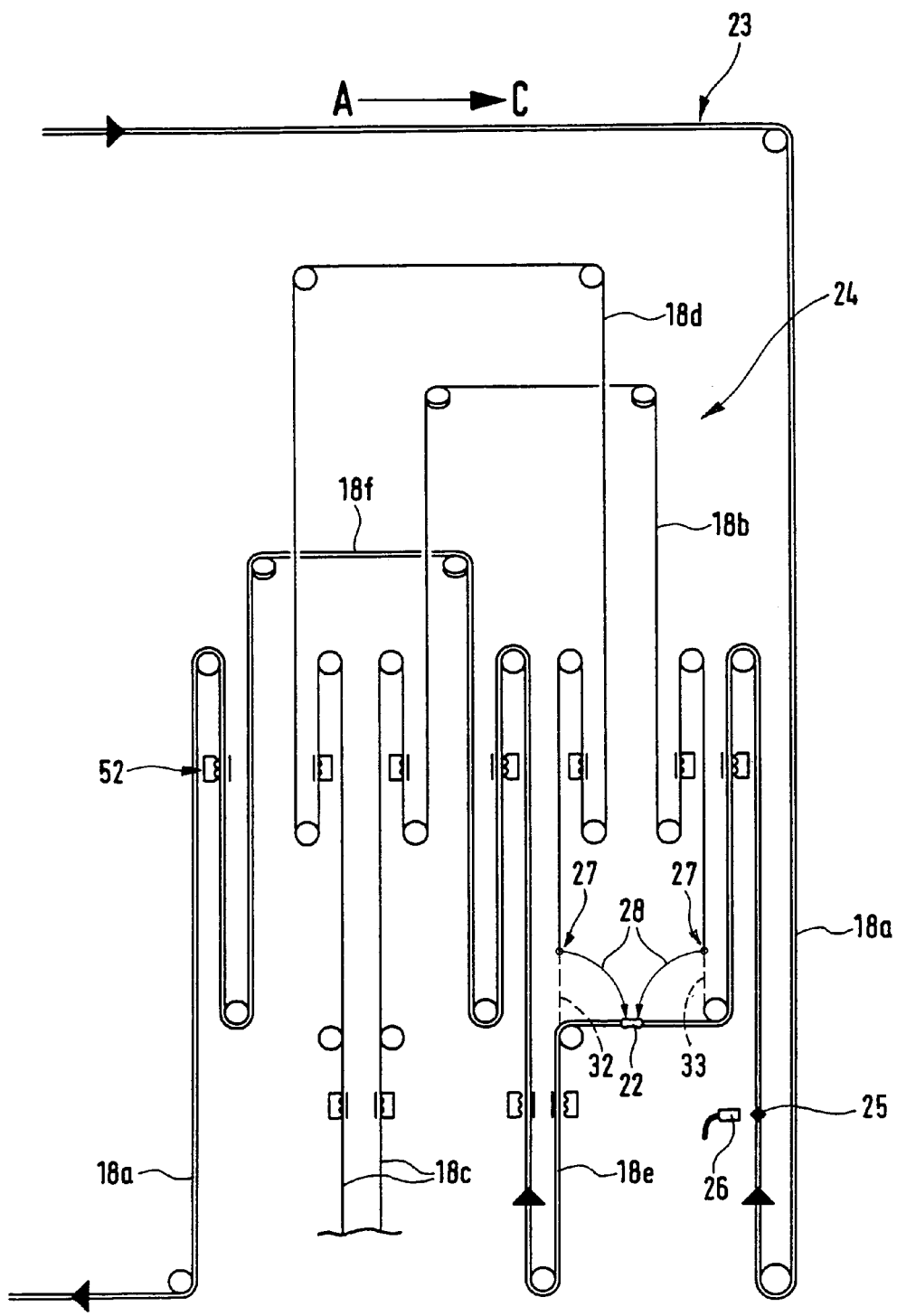
FIG. 8 is representation similar to FIG. 7 to indicate the measures for resetting to change from the version "A" to the version "C".
Figure 9:
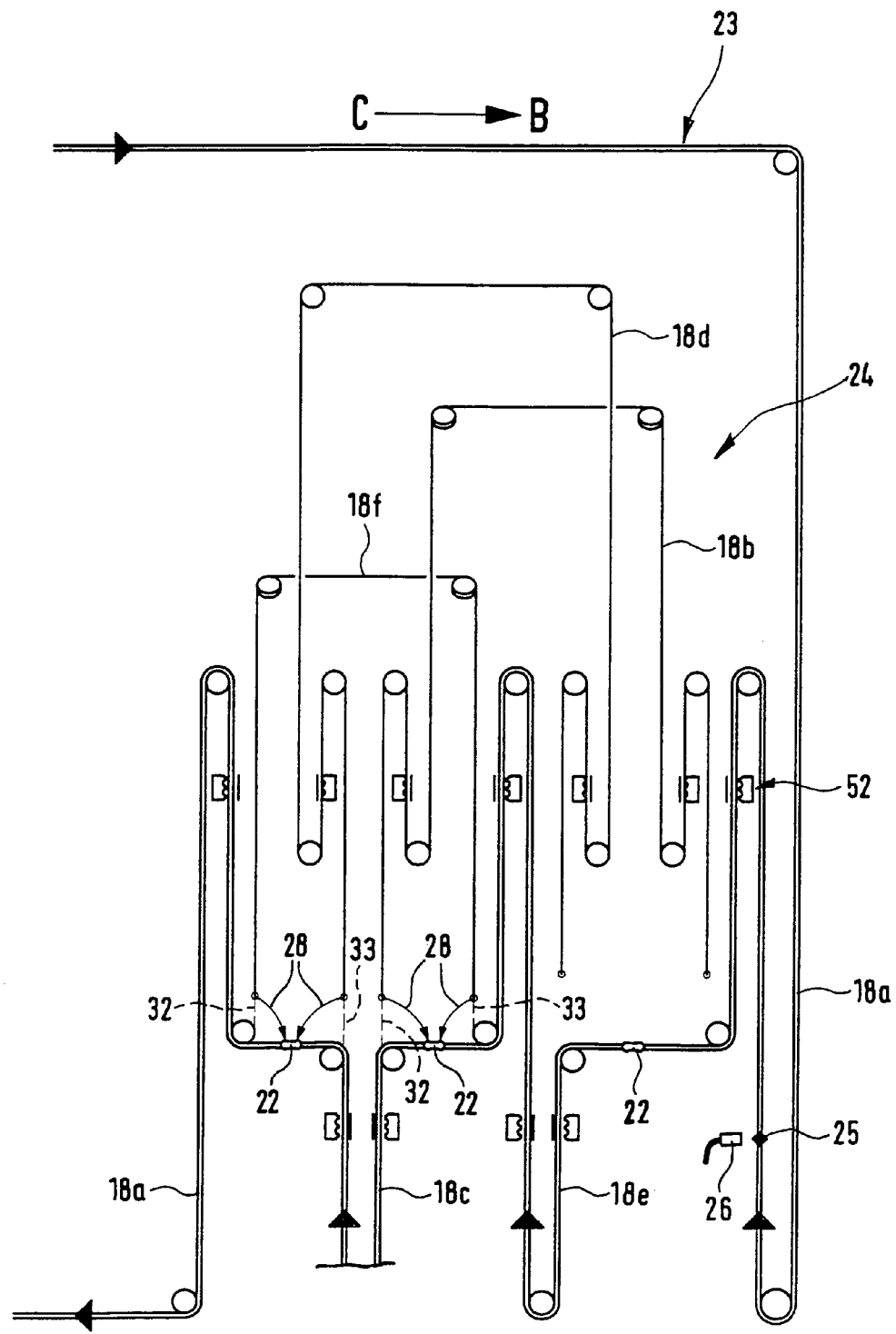
FIG. 9 is a representation to compare the measures for resetting to change from the version "C" to the version "B".

FIGS. 7 through 9 show as an example different forms of resetting possible with the working embodiment and with a constant reset position of the conveyor chain 23.

FIG. 7 shows the operations involved for resetting of the version "A" (FIG. 1) to produce the version "B" (FIG. 4). In the case of this presetting the conveyor chain sections 18b, 18d and 18f still involved actively in the version "A" are deactivated. For the sake of clarity such deactivated conveyor chain sections are depicted in thin lines.

The deactivated conveyor chain sections 18b, 18d and 18f are incorporated in the conveyor chain 23 prior to the deactivation at the coupling points 27 using the above mentioned chain joints 22 in the conveying chain 23. For such resetting the chain joints 22 are opened so that the end regions, so far connected with each other at the coupling points 27, of the conveyor chain sections are separated from each other and by changing their position may be shifted to be in the vicinity of the terminal region of another conveyor chain section in order to produce a new linking sequence of the conveyor chain sections using the chain joints or coupling means 22.

Arrows 28 serve to indicate how, till resetting occurs, terminal sections 32 and 33, coupled with another conveyor chain section and indicated in chained lines, may be so changed in their position (after disconnecting the chain joints 27, for example by pivotal movement) that they are adjacent to a respective terminal section 33 and 32 of another conveyor chain section and may be linked with it by a chain joint 22.

It will be seen that the division of the conveyor chain sections 18a through 18f, and more especially the selection of their respective length is such that after shifting of the uncoupled terminal regions there are again combinations, in which the terminal regions to be relinked are located in the immediate vicinity of each other so that only the chain joints 22 must be activated.

It will be seen from the drawing that the terminal regions, changed in position, of the conveyor chain sections have a different alignment, after resetting, to that prior to the change in position.

Whereas in the case of the resetting in accordance with FIG. 7 all chain joints 27 participate, the manipulations taking place in the case of the resetting illustrated in FIG. 8 of the version "A" (FIG. 1) to produce the version "C" (FIG. 5) are limited to the two chain joints 27, which in the version "A" connect the conveyor chain sections 18a and 18b and also the conveyor chain sections 18e and 18d with one another. The terminal regions here disconnected of the conveyor chain sections 18a and 18e are directly joined together by chain joints 22 so that a shortened conveyor chain 23 is produced which no longer extends through the litho station "OS".

FIG. 9 indicates that resetting measures in the different versions to modify one particular version and arrive at another are possible. Here resetting the version "C" (FIG. 5) to arrive at the version "B" (FIG. 4) is explained, the litho station "OS" again being included in the chain path.

In order to use the numerous possibilities of resetting in the working example the conveyor chain arrangement 8 is generally so designed that it possesses several longitudinal chain sections 34, 35, and 36 moving past each other and intersecting each other with a horizontal offset. The number of the mutually offset longitudinal chain sections 34, 35 and 36 is preferably equal to the number of processing stations, which is to be varied, served by the conveyor chain arrangement 8, there being three such processing stations in the working embodiment.

This arrangement is made particularly clear inter alia in conjunction with FIG. 3. Here it is to be seen that conveyor chain arrangement 8 has a principal component 37 extending through all processing stations 4 and the product entry station 5 and the product exit station 6 and preferably furthermore the dryer 17 and the chain return element 38, i.e. the return connection between the product entry station 5 and the product exit station 6. This component of the conveyor chain arrangement 8 extends in a vertical principal plane 42 indicated in FIG. 3, from which the hollow body carriers 14 stand at a right angle. In order to ensure that the hollow body carriers 14 are slanted slightly to the rear and there is a stable holding of the slipped on hollow bodies 2, the principal plane 42 is preferably slightly inclined in relation to a vertical plane.

The principal component 37, extending in the principal plane 42, also includes the conveyor chain section 18*d*, running in the resetting zone 24, and constituting the first (34) intersecting longitudinal chain sections.

In addition to the principal component 37 the conveyor chain arrangement 8 of the working embodiment possesses furthermore two further components running alongside the principal plane 42, which, because they partially obviate the principal component in practice, are termed detour components 43 and 44. The first detour components 43 is constituted by the conveyor chain section 18*b* and the second detour components 44 by the conveyor chain section 18*f*.

As will be seen from the drawing the two detour components 43 and 44 are so curved to leave the principal plane 42 that they at least partially run in planes offset in relation to the principal plane and are in a position of passing along and intersecting the chain sections (belonging to the principal component 37) with an offset and without colliding.

Accordingly an arrangement is possible wherein the first longitudinal chain section 34 constituted by the conveyor chain section 18*d* is passed by a second longitudinal chain section 35 with a horizontal offset, same belonging to the conveyor chain section 18*b* and accordingly simultaneously to the first detour component 43. At the same time a third longitudinal chain section 36 belonging to the conveyor chain section 18*f* and therefore to the second detour component 44 may also be offset in relation to the principal plane 42 and if necessary also run past with an offset in relation to the first detour component 43.

For diverting the detour components 43 and 44 from the principal plane 42 the corresponding longitudinal chain sections 35 and 36 are compelled by stationary guide rails 45 (which are only diagrammatically indicated in the drawing) to rum along a relatively large radius into the desired path. In this respect advantage is taken of the fact that the chain links 12 have a small play in the joint parts 46, such play permitting a slightly oblique setting between the chain links 12 following each other in sequence in the conveying direction 16, adjacent chain links 12 respectively moving about a virtual axis 47 extending horizontally and in parallelism to the principal plane 42. The chain links 12 are then practically forced to "lean over backward".

Following the desired intersecting region the diverted or deflected detour component 43 and 44 is returned back to the principal plane 42 so that zones with a potential overload are minimized.

In the working embodiment illustrated in FIGS. 1 through 9 the two detour components 43 and 44 are on the same side of the principal plane 42. For instance they both lie behind such principal plane 42. It will be clear from FIGS. 10 and 11 however that a constellation is possible in which one detour component 44 runs behind, and the other detour component runs in front of the principal plane 42. There are therefore detour components 43 and 44 on either side of the principal plane 42, something which in some cases may facilitate access to the individual components.

Figure 10:
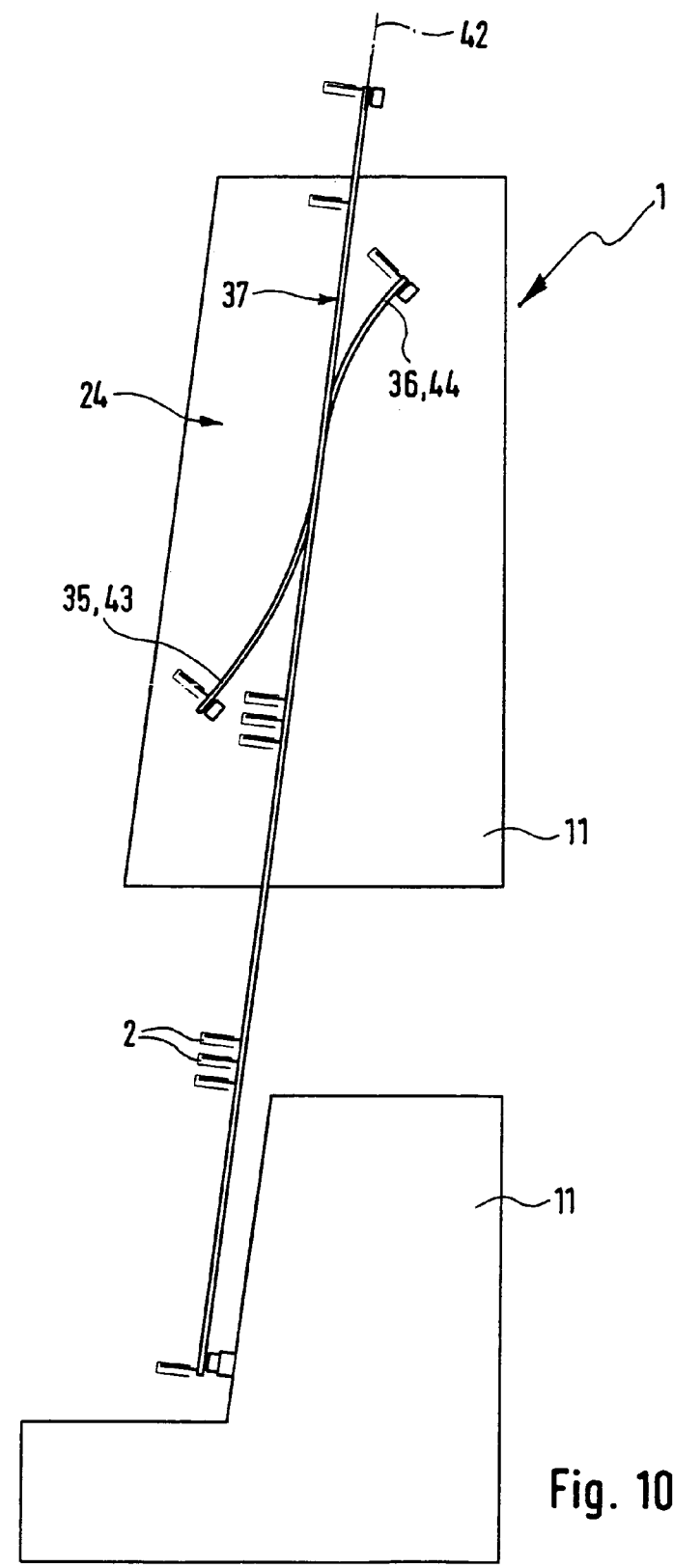
FIG. 10 is an end-on view looking in the direction of the arrow III of FIG. 1 to show a further embodiment of the apparatus in accordance with the invention, in which the conveyor chain arrangement has detour components on either side of a principal plane.
Figure 11:
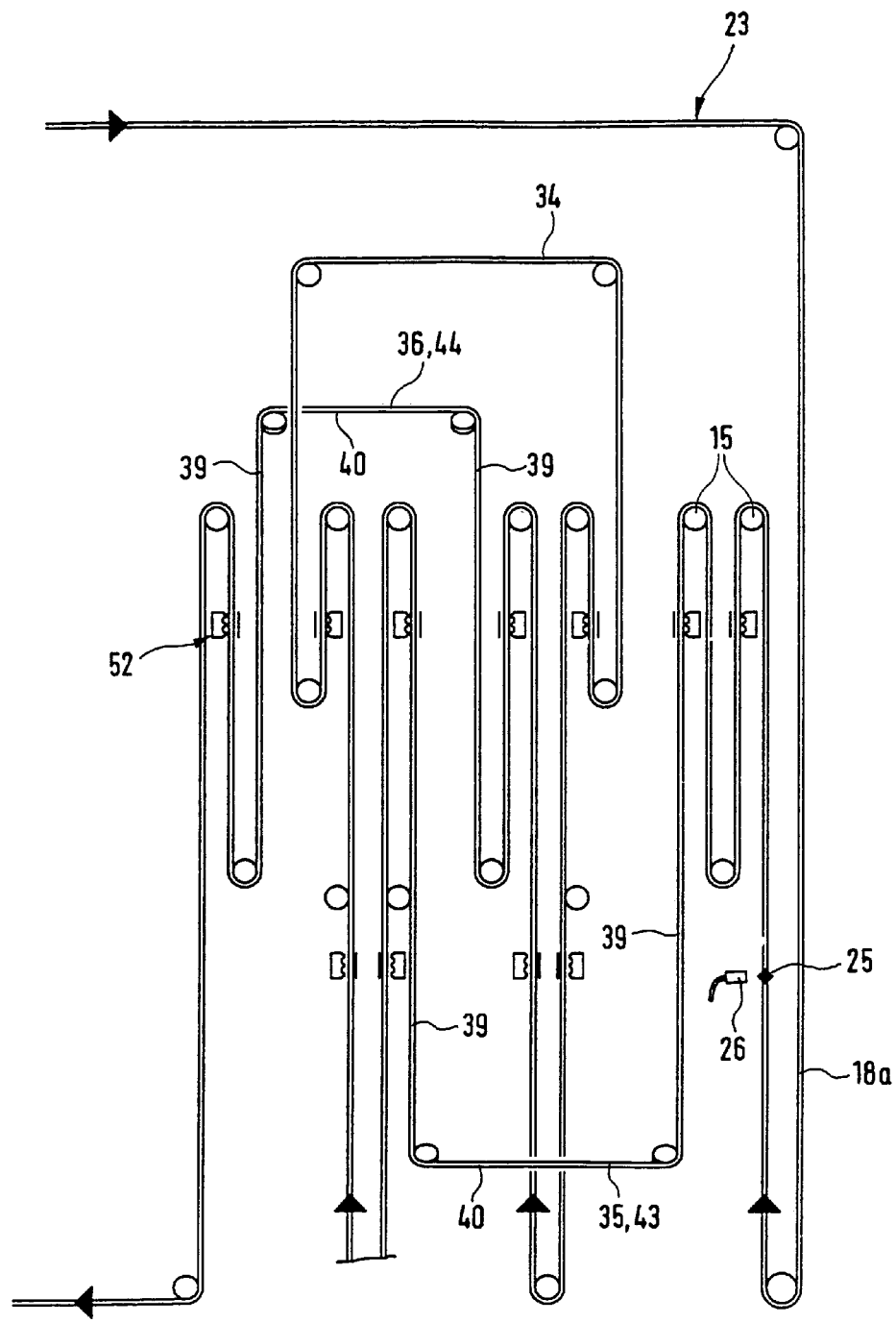
FIG. 11 represents the arrangement of FIG. 10 in a diagrammatic front view principally featuring the resetting zone.

While in the case of the embodiment of FIGS. 1 through 9 intersecting of the conveyor chain sections lying in the principal plane 42 takes place via overhead longitudinal chain sections 35 and 36 of the two detour components 43 and 44, in the case of FIGS. 10 and 11 the corresponding chain intersection occurs via a downwardly set second longitudinal chain section 35 of the first detour component 43 and an upwardly set third longitudinal chain section 36 of the second detour component 44.

Preferably the conveyor chain arrangement 8 respectively runs in a U-like path at the two detour components 43 and 44, in the case of FIGS. 1 through 9 with all U's opening downward whereas in accordance with FIGS. 10 and 11, the U opening in the case of the detour component 44 (constituting the overhead longitudinal chain section 35) being directed downward and the U opening of the detour component 43 (constituting the bottom longitudinal chain section 35) being directed upward. The vertical conveyor chain sections 39, corresponding to the limbs of a U, are those components, which run out of the principal plane 42, which extend out of the principal plane 42, and the horizontal longitudinal chain sections 40, corresponding to the head of a U, run parallel to the principal plane 42 with an intersection of vertical longitudinal chain sections of other chain components. This arrangement is made clear inter alia by FIG. 2.

FIGS. 2, 7 through 9 and 11 indicate preferably present chain holders 52 associated with the conveyor chain arrangement 8. These chain holders 52 render it possible to detachably lock the individual conveyor chain sections 18*a* through 18*f* immovably at least during resetting to have a different chain path. The actuation of the chain holders 52 is preferably effected electrically or by fluid power.

Owing to the use of the chain holders 52 the handling of the conveyor chain sections 18*a* through 18*f* during resetting is simplified, because this prevents conveyor chain sections, which are uncoupled from one another, unwinding under their own weight from one or more bend pulleys 15 present. This furthermore applies also for a case in which the chain holders 52 are employed to stationarily lock a uncoupled, deactivated conveyor chain section during the immobilization phase.

The chain holders 52 render possible a preferred clamping action on the respective conveyor chain section 18*a* through 18*f* to be locked. As indicated in FIG. 7 with an enlarged section view, the chain holder 52 may have at least one clamping jaw 53, which in the activated state interlockingly engages the adjacent chain links 12 and simultaneously bears against an abutment 54, for example one in the form of a plain bearing face.

The activation of the chain holders 52 preferably takes place under electronic control in conjunction with the positioning of the conveying chain 23 in the resetting position. The control of the apparatus 1 may be so designed that the desired version of the chain path may be preselected and accordingly the chain holders 52 required therefor may be activated for the time being or activated for the duration of a stationary phase.

For normal requirements a certain degree of pretensioning of the conveying chain 23 is necessary. This is effected by a tensioning means 55 diagrammatically indicated in FIG. 1, able to be electrically, pneumatically or hydraulically activated. For resetting the conveying chain 23 to have a different path the tensioning means 55 can be so operated that the chain tension is temporarily reduced, something which considerably facilitates manipulations, more particularly at the chain joints 22.

The invention claimed is:

1. An apparatus for decorating hollow bodies, comprising several processing stations of different types and designed to perform processing operations on hollow bodies supplied to them, and a conveyor chain arrangement for serving the individual processing stations and designed for conveying the hollow bodies, the conveyor chain arrangement including several conveyor chain sections located in the apparatus and being able to be linked together by coupling means as a conveyor chain in a closed loop in alternative different paths, the conveyor chain being adapted to perform a circulating movement in operation, the processing stations in the different paths of the conveyor chain being one or both of passed through by the conveyor chain in a different order and partly not being passed through by the conveyor chain.

2. The apparatus as set forth in claim 1, wherein said conveyor chain arrangement possesses a chain element with hollow body carriers arranged distributed a long the length of the element and adapted for detachably carrying the hollow bodies.

3. The apparatus as set forth in claim 2, wherein said hollow body carriers possess rod structures extending away from the chain element.

4. The apparatus as set forth in claim 2, wherein said coupling means are in the form of chain joints.

5. The apparatus as set forth in claim 2, wherein said conveyor chain arrangement possesses a plurality of intersecting longitudinal chain sections adapted to move past each other in a crossing manner and with a mutually horizontal offset.

6. The apparatus as set forth in claim 5, wherein the number of mutually horizontal offset longitudinal chain sections of the conveyor chain arrangement is equal to the number of processing stations served by the arrangement and to be varied as regards being served by the arrangement.

7. The apparatus as set forth in claim 2, wherein the conveyor chain arrangement runs in a principal component serving all processing stations and running in an upright principal plane which is preferably slightly inclined in relation to the vertical and comprises at least one detour component diverted from the principal plane and running alongside the principal plane.

8. The apparatus as set forth in claim 7, comprising a plurality of detour components, of the conveyor chain arrangement, extending with an offset in relation to each other athwart the principal plane.

9. The apparatus as set forth in claim 8, wherein several detour components run in at least one manner selected from the group consisting of running on the same side of the principal plane and running on mutually opposite sides of the principal plane.

10. The apparatus as set forth in claim 7, wherein the longitudinal chain section of the at least one detour component intersects at least one longitudinal chain section of the principal component with a horizontal offset.

11. The apparatus as set forth in claim 7, wherein the longitudinal chain section of the at least one detour component is guided by a guide rail to adopt an arcuate path diverted from the principal plane.

12. The apparatus as set forth in claim 2, wherein in the case of at least one path of the conveyor chain all conveyor chain sections of the conveyor chain arrangement are linked with one another so as to form a closed loop.

13. The apparatus as set forth in claim 3, wherein in the case of at least one path of the conveyor chain at least one conveyor chain section is uncoupled and is operationally inactivated while remaining on the apparatus.

14. The apparatus as set forth in claim 2, wherein the conveyor chain is able to be shifted into at least one resetting position, in which the terminal regions of several conveyor chain sections assume such a position that after disconnecting the coupling means associated with them the terminal regions are able to be shifted in position into the vicinity of the terminal region of another conveyor chain section and are able to be coupled with same to set a different chain path.

15. The apparatus as set forth in claim 14, wherein the terminal region, shifted in its position, of a conveyor chain section possesses a different alignment to that preceding such change in position.

16. The apparatus as set forth in claim 14, wherein the conveyor chain possesses at least one mark able to be shifted to produce the resetting position by suitable shifting of the conveyor chain into a predetermined processing position.

17. The apparatus as set forth in claim 16, comprising sensor means for detecting the mark when same has arrived in the processing position.

18. The apparatus as set forth in claim 14, wherein at least one conveyor chain section is a component of the conveyor chain in the case of every set path of the conveyor chain, and preferably the resetting position of the conveyor chain applies for all modifications of the chain with the same location of the conveyor chain section constantly belonging to the conveyor chain.

19. The apparatus as set forth in claim 14, wherein in at least one resetting position of the conveyor chain all coupling means provided for a modification of the chain path are concentrated in a resetting zone of the apparatus.

20. The apparatus as set forth in claim 2, wherein several chain holders are associated to the conveyor chain arrangement by which the individual conveyor chain sections may be locked and immobilized during resetting to adopt a different chain path.

21. The apparatus as set forth in claim 20, comprising at least one chain holder for detachably locking a non-operational conveyor chain section during the time of such immobilization.

22. The apparatus as set forth in claim 20, wherein at least one chain holder is designed for a clamping engagement with the conveyor chain section to be immobilized.

23. The apparatus as set forth in claim 2, comprising a tensioning means for tensioning the conveyor chain and rendering possible a reduction of the chain tension during a modification of the chain path.

24. The apparatus as set forth in claim 2, wherein said processing stations served by the conveyor chain arrangement include at least one station selected from the group consisting of at least one screen printing station, at least one litho station, and at least one varnishing station.

* * * * *